(12) United States Patent
Cho

(10) Patent No.: US 11,947,027 B2
(45) Date of Patent: Apr. 2, 2024

(54) METHOD AND APPARATUS FOR POSITIONING

(71) Applicant: LOCAILA, INC, San Jose, CA (US)

(72) Inventor: Jaihyung Cho, Daejeon (KR)

(73) Assignee: Locaila, Inc, San Jose, CA (US)

( * ) Notice: Subject to any disclaimer, the term of this patent is extended or adjusted under 35 U.S.C. 154(b) by 157 days.

(21) Appl. No.: 17/574,568

(22) Filed: Jan. 13, 2022

(65) Prior Publication Data
US 2023/0221400 A1 Jul. 13, 2023

(51) Int. Cl.
*G01S 3/02* (2006.01)
*G01S 5/02* (2010.01)
*G01S 5/12* (2006.01)
G01S 5/04 (2006.01)
G01S 5/06 (2006.01)

(52) U.S. Cl.
CPC ........ *G01S 5/0244* (2020.05); *G01S 5/02213* (2020.05); *G01S 5/12* (2013.01); *G01S 5/0268* (2013.01); *G01S 5/0289* (2013.01); *G01S 5/04* (2013.01); *G01S 5/06* (2013.01)

(58) Field of Classification Search
CPC ...... G01S 5/0244; G01S 5/02213; G01S 5/12; G01S 5/0268; G01S 5/04; G01S 5/06; G01S 5/0289
USPC ................................................. 342/451, 386
See application file for complete search history.

(56) References Cited

U.S. PATENT DOCUMENTS

| | | | | |
|---|---|---|---|---|
| 7,132,981 | B1* | 11/2006 | Roberts | G01S 5/06 342/464 |
| 8,077,089 | B2* | 12/2011 | Parker | G01S 19/44 342/442 |
| 8,711,037 | B2* | 4/2014 | Parker | G01S 19/44 342/442 |
| 8,949,069 | B2* | 2/2015 | Roberts | G01S 11/12 702/159 |
| 9,137,680 | B2* | 9/2015 | Pisharody | G01S 5/00 |
| 10,345,429 | B2* | 7/2019 | Rollero | G01S 5/02216 |
| 11,601,913 | B2* | 3/2023 | Cho | G01S 5/021 |
| 11,616,617 | B2* | 3/2023 | Cho | H04L 27/2613 370/329 |
| 2021/0357907 | A1* | 11/2021 | Shpak | G06Q 10/0836 |

(Continued)

FOREIGN PATENT DOCUMENTS

EP 2585846 B1 * 8/2016 ............. G01S 5/021
EP 2585946 B1 8/2016

*Primary Examiner* — Chuong P Nguyen

(57) ABSTRACT

Provided is a positioning apparatus including a communicator including at least three transceivers that are arranged in a first line; and a processor configured to calculate a first phase difference between reference signals received by a first transceiver pair arranged in the first line, a second phase difference between reference signals received by a second transceiver pair arranged in the first line, and a third phase difference between reference signals received by a third transceiver pair arranged in the first line, to determine an integer ambiguity of the second phase difference and an integer ambiguity of the third phase difference based on the first phase difference, and to calculate a position of an apparatus to be positioned based on the second phase difference, the integer ambiguity of the second phase difference, the third phase difference, and the integer ambiguity of the third phase difference.

18 Claims, 11 Drawing Sheets

(56) References Cited

U.S. PATENT DOCUMENTS

2022/0132461 A1* 4/2022 Matsumoto ............... G01S 5/04
2022/0312361 A1* 9/2022 Cho .......................... G01S 5/04

* cited by examiner

METHOD AND APPARATUS FOR POSITIONING

BACKGROUND

1. Field

The present disclosure of the following description relates to a method and apparatus for positioning.

2. Related Art

Currently, with the spread of smartphones, Internet of things (IoT), and autonomous vehicles, location information-based services are frequently provided. To provide such a location information-based service, it is important to accurately measure a position of an apparatus to be positioned.

A variety of technology is being used to measure a position of an apparatus. As one of positioning methods, there is a method using a carrier phase measurement. Using the method, a carrier may be received and position coordinates may be estimated based on phase information of the carrier.

However, a complex calculation may be required to determine position information from phase information of the carrier. Typically, the phase information includes an error corresponding to an integer multiple of a carrier wavelength, which is referred to as an integer ambiguity. The integer ambiguity generally causes a positioning error.

SUMMARY

At least one example embodiment provides a method and apparatus for positioning based on a phase measurement of a signal.

According to an aspect, there is provided a positioning apparatus including a communicator including at least three transceivers that are arranged in a first line; and a processor configured to calculate a first phase difference between reference signals received by a first transceiver pair arranged in the first line, a second phase difference between reference signals received by a second transceiver pair arranged in the first line, and a third phase difference between reference signals received by a third transceiver pair arranged in the first line, to determine an integer ambiguity of the second phase difference and an integer ambiguity of the third phase difference based on the first phase difference, and to calculate a position of an apparatus to be positioned based on the second phase difference, the integer ambiguity of the second phase difference, the third phase difference, and the integer ambiguity of the third phase difference.

The processor may be configured to calculate the first phase difference by converting the reference signals received by the first transceiver pair to baseband demodulated signals, by calculating a conjugate multiplication of the baseband demodulated signals, and by calculating a phase angle of the conjugate multiplication of the baseband demodulated signals.

A distance between transceivers included in the first transceiver pair may be less than a distance between transceivers included in the second transceiver pair and a distance between transceivers included in the third transceiver pair.

The distance between the transceivers included in the first transceiver pair may be less than a half of a carrier wavelength of the reference signal, and each of the distance between the transceivers included in the second transceiver pair and the distance between the transceivers included in the third transceiver pair may be greater than the half of the carrier wavelength of the reference signal.

The processor may be configured to determine a first asymptote of a hyperbola corresponding to the second transceiver pair based on the second phase difference and the integer ambiguity of the second phase difference, to determine a second asymptote of a hyperbola corresponding to the third transceiver pair based on the third phase difference and the integer ambiguity of the third phase difference, and to calculate the position of the apparatus to be positioned based on the first asymptote and the second asymptote.

The processor may be configured to determine a coefficient matrix and a right-hand side vector based on the first asymptote and the second asymptote and to calculate the position of the apparatus to be positioned using the coefficient matrix and the right-hand side vector.

The communicator may further include at least three transceivers that are arranged in a second line intersecting the first line.

The processor may be configured to calculate a fourth phase difference between reference signals received by a fourth transceiver pair arranged in the second line, a fifth phase difference between reference signals received by a fifth transceiver pair arranged in the second line, and a sixth phase difference between reference signals received by a sixth transceiver pair arranged in the second line, to determine an integer ambiguity of the fifth phase difference and an integer ambiguity of the sixth phase difference based on the fourth phase difference, and to calculate the position of the apparatus to be positioned by further considering the fifth phase difference, the integer ambiguity of the fifth phase difference, the sixth phase difference, and the integer ambiguity of the sixth phase difference.

A distance between transceivers included in the fourth transceiver pair may be less than a distance between transceivers included in the fifth transceiver pair and a distance between transceivers included in the sixth transceiver pair.

The distance between the transceivers included in the fourth transceiver pair may be less than a half of a carrier wavelength of the reference signal, and each of the distance between the transceivers included in the fifth transceiver pair and the distance between the transceivers included in the sixth transceiver pair may be greater than the half of the carrier wavelength of the reference signal.

The processor may be configured to determine a first asymptote of a hyperbola corresponding to the second transceiver pair based on the second phase difference and the integer ambiguity of the second phase difference, to determine a second asymptote of a hyperbola corresponding to the third transceiver pair based on the third phase difference and the integer ambiguity of the third phase difference, to determine a third asymptote of a hyperbola corresponding to the fifth transceiver pair based on the fifth phase difference and the integer ambiguity of the fifth phase difference, to determine a fourth asymptote of a hyperbola corresponding to the sixth transceiver pair based on the sixth phase difference and the integer ambiguity of the sixth phase difference, and to calculate the position of the apparatus to be positioned based on the first asymptote, the second asymptote, the third asymptote, and the fourth asymptote.

The processor may be configured to calculate the position of the apparatus to be positioned by determining a coefficient matrix and a right-hand side vector based on the first asymptote, the second asymptote, the third asymptote, and the fourth asymptote and by calculating a multiplication between a pseudo inverse matrix of the coefficient matrix and the right-hand side vector.

According to an aspect, there is provided a positioning method performed by a positioning apparatus including a communicator and a processor. The communicator includes at least three transceivers that are arranged in a first line, and the positioning method includes receiving, by each of the transceivers arranged in the first line, a reference signal from an apparatus to be positioned; calculating, by the processor, a first phase difference between reference signals received by a first transceiver pair arranged in the first line, a second phase difference between reference signals received by a second transceiver pair arranged in the first line, and a third phase difference between reference signals received by a third transceiver pair arranged in the first line; determining, by the processor, an integer ambiguity of the second phase difference and an integer ambiguity of the third phase difference based on the first phase difference; and calculating, by the processor, a position of the apparatus to be positioned based on the second phase difference, the integer ambiguity of the second phase difference, the third phase difference, and the integer ambiguity of the third phase difference.

The calculating, by the processor, the first phase difference may include calculating the first phase difference by converting the reference signals received by the first transceiver pair to baseband demodulated signals, by calculating a conjugate multiplication of the baseband demodulated signals, and by calculating a phase angle of the conjugate multiplication of the baseband demodulated signals.

According to at least one example embodiment, it is possible to determine a position of an apparatus to be positioned based on a phase difference between reference signals received by a transceiver pair.

According to at least one example embodiment, it is possible to easily determine an integer ambiguity of a phase difference between reference signals received by a transceiver pair.

According to at least one example embodiment, it is possible to perform smooth positioning regardless of a position of an apparatus to be positioned by arranging transceiver pairs in at least two lines.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

DETAILED DESCRIPTION

Figure 1:
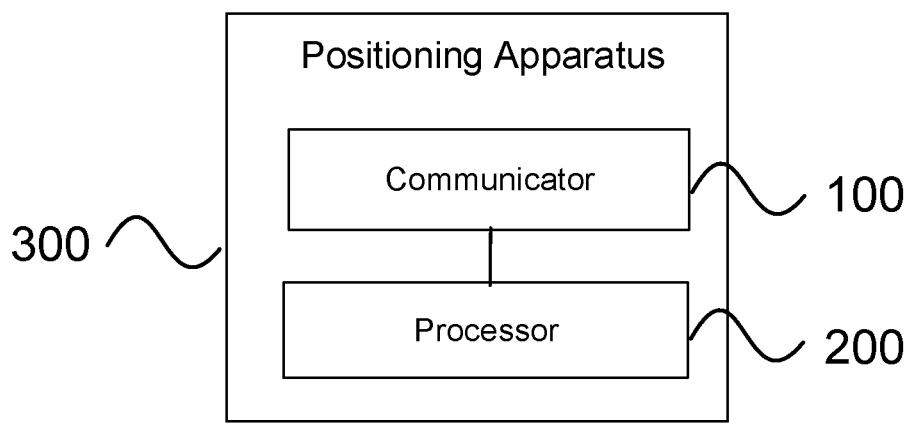
FIG. 1 is a diagram illustrating an example of a positioning apparatus according to at least one example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first," "second," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "accessed to" another component, the component may be directly connected to or accessed to the other component, or one or more other intervening components may be present. In contrast, when a component is referred to as being "directly connected to" or "directly accessed to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising (incudes/including)," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms including technical and scientific terms used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

FIG. 1 is a diagram illustrating an example of a positioning apparatus according to at least one example embodiment.

Referring to FIG. 1, the positioning apparatus may include a communicator 100 and a processor 200 connected to the communicator 100. The communicator 100 may include a plurality of transceivers. Each of the transceivers may transmit or receive a wireless signal. As another example, each of the transceivers may perform only a function of receiving a wireless signal. Each of the transceivers may receive a reference signal transmitted from an apparatus to be positioned. The reference signal may include a wireless signal used for positioning.

The processor 200 may analyze reference signal data received by each of the transceivers of the communicator 100. The processor 200 may calculate a phase difference between reference signals received by at least two transceivers. The processor 200 may calculate position coordinates of the apparatus to be positioned based on the phase difference.

Figure 11:
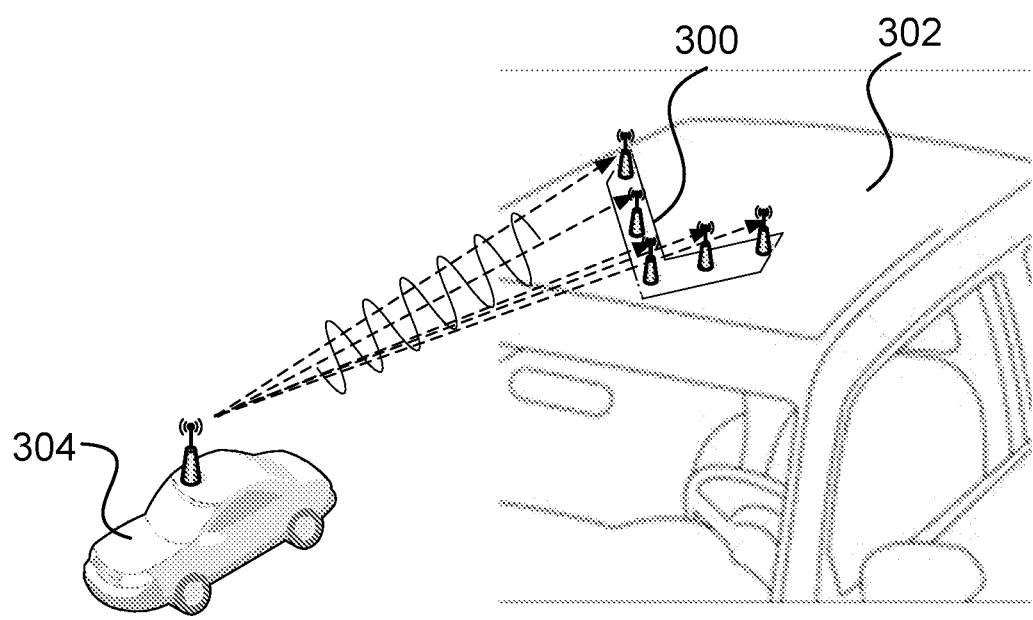
FIG. 11 illustrates an example showing the positioning apparatus installed on top of a vehicle and measures the position of another vehicle according to an embodiment of the present invention.

Referring to FIG. 11, the positioning apparatus may be used in various fields. For example, the positioning apparatus may be installed on at least a portion of a vehicle and may measure a position of another vehicle or a mobile device. The positioning apparatus 300 further comprises a processor 200 that is connected or integrated with the transceivers and that is configured to calculate a position of the other vehicle 304 or the mobile device 20 based on the reference signals received by the transceivers. As another example, the positioning apparatus may be installed on a base station, a relay device, and a user equipment. The positioning apparatus may be used to verify a position of a wireless terminal, a position of another vehicle in a vehicle-to-everything (V2X) scenario, and a position of a wireless router.

Figure 2:
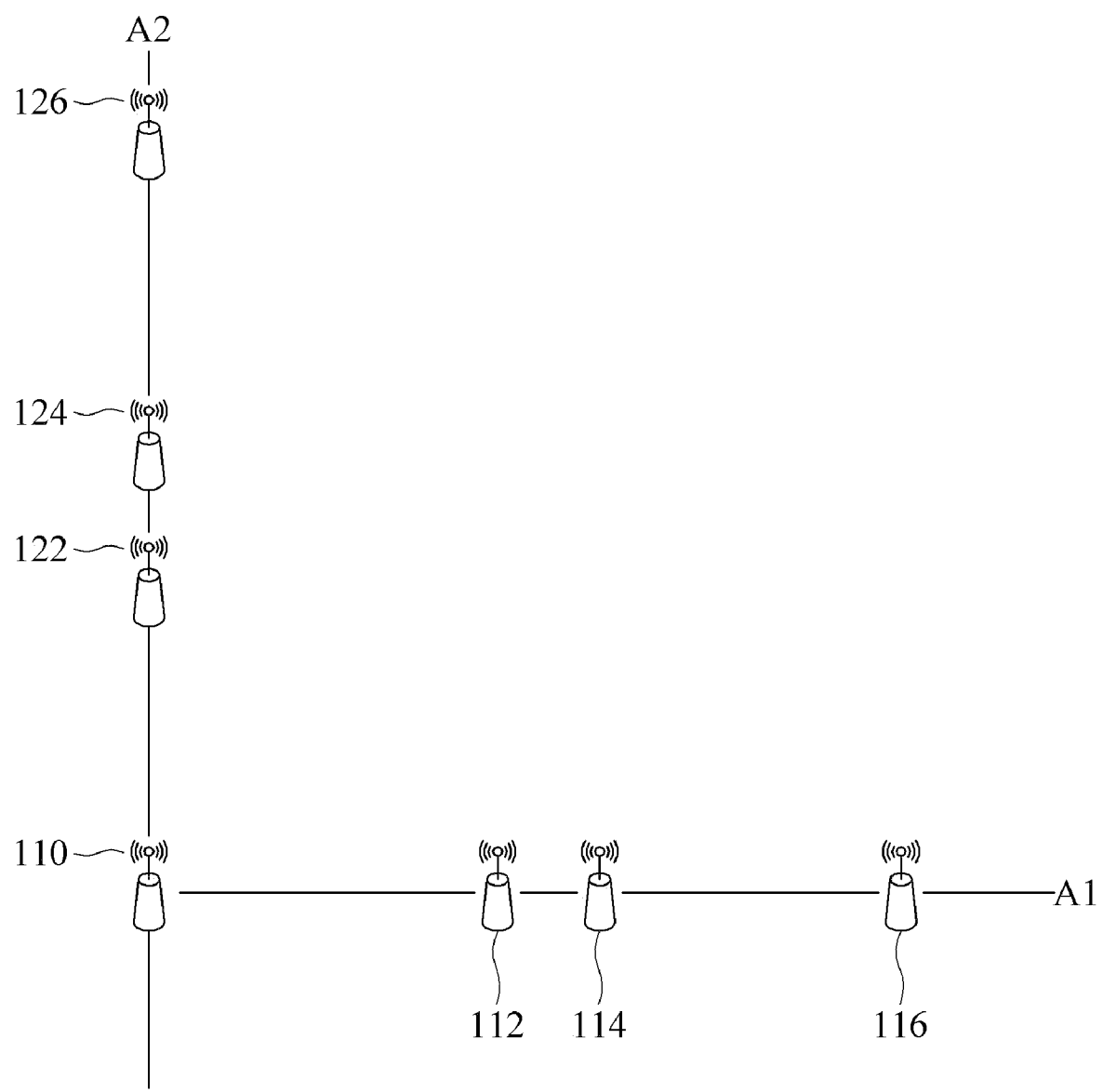
FIG. 2 illustrates an example of a plurality of transceivers included in a communicator of FIG. 1 according to at least one example embodiment.

FIG. 2 illustrates an example of a plurality of transceivers included in the communicator 100 of FIG. 1 according to at least one example embodiment.

Referring to FIG. 2, the communicator 100 may include transceivers 110, 112, 114, and 116 that are arranged on a first line A1 and transceivers 110, 122, 124, and 126 that are arranged on a second line A2. The transceiver 110 may be provided at an intersection of the first line A1 and the second line A2 and may perform all a signal reception functionality on the first line A1 and a signal reception functionality on the second line A2. Therefore, a number of the transceivers included in the communicator 100 may decrease. However, it is provided as an example only. For example, a transceiver may be installed at the interaction of the first line A1 and the second line A2.

At least three transceivers may be provided to each of the first line A1 and the second line A2. FIG. 1 illustrates an example in which four transceivers are arranged in each of the first line A1 and the second line A2. However, it is provided as an example only. For example, at least three or at least five transceivers may be arranged in each of the first line A1 and the second line A2.

Since at least three transceivers are arranged in the first line A1, the processor 200 may select at least two transceiver pairs from the first line A1. For example, when three transceivers are arranged in the first line A1, the processor 200 may select $_3C_2=3$ transceiver pairs from the first line A1. When four transceivers are arranged in the first line A1, the processor 200 may select $_4C_2=6$ transceiver pairs from the first line A1. The processor 200 may calculate a phase difference between reference signals received by transceivers included in a transceiver pair. The processor 200 may calculate a difference in travel distance between the reference signals received by the transceivers based on the phase difference. The processor 200 may calculate position coordinates of the apparatus to be positioned based on differences in travel distance between the reference signals acquired from the plurality of transceiver pairs.

A distance between transceivers arranged in each of the first line A1 and the second line A2 may be inconsistent. For example, in the first line A1, a distance between the transceiver 110 and the transceiver 112 may be relatively large and a distance between the transceiver 112 and the transceiver 114 may be relatively small. According to a decrease in a distance between transceivers included in a transceiver pair, it may be easy to determine an integer ambiguity of a phase difference between reference signals. However, a change rate of a phase difference between reference signals according to a difference in travel distance between the reference signals may be relatively great. Therefore, a positioning error may have a relatively influence on the phase difference. According to an increase in a distance between transceivers included in a transceiver pair, it may be difficult to determine an integer ambiguity of a phase difference between reference signals. However, a change rate of a phase difference between reference signals according to a difference in travel distance between the reference signals may be relatively small. Therefore, when the distance between the transceivers is relatively great, the positioning error may have a relatively small influence on the phase difference.

Figure 3:
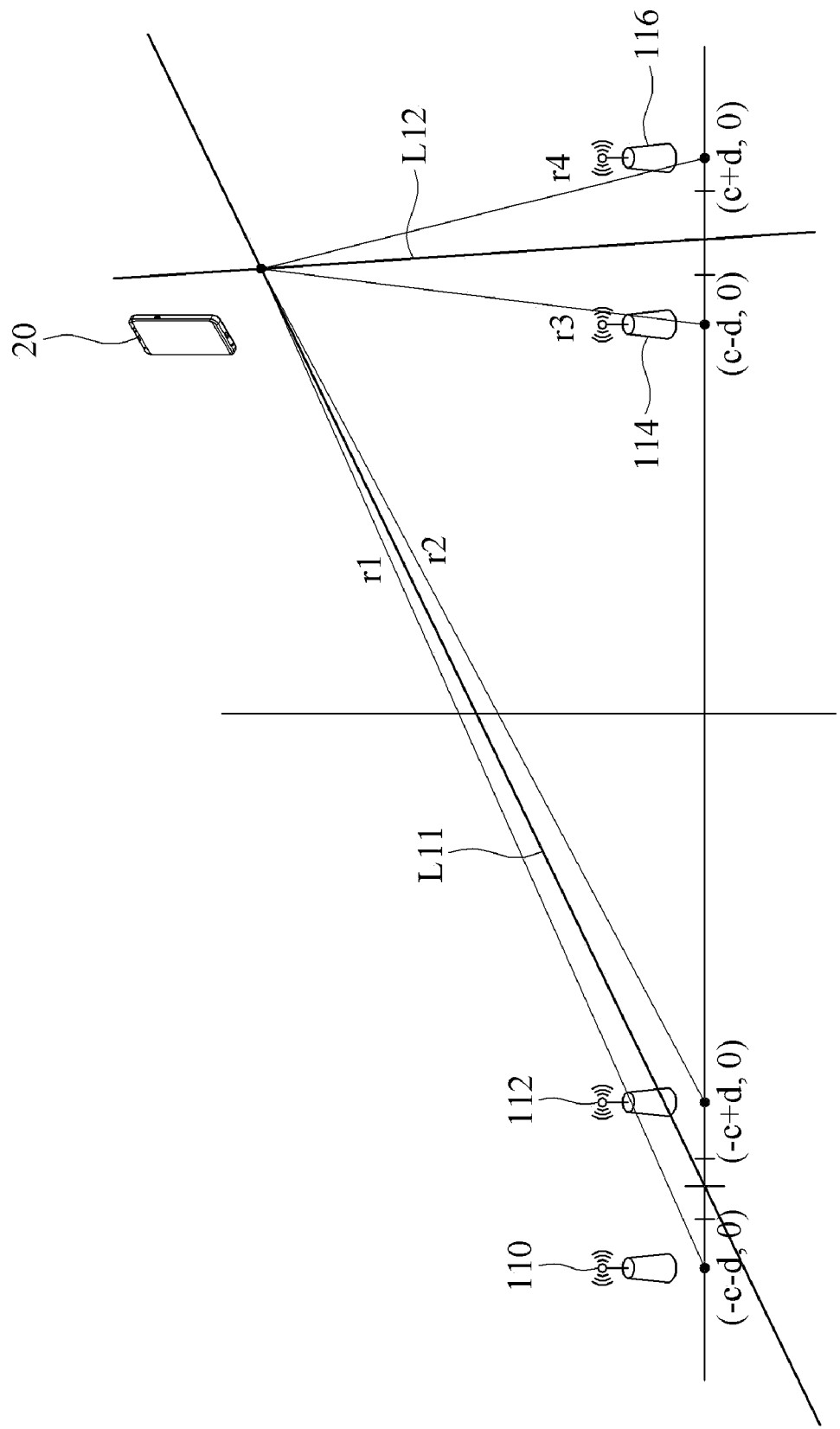
FIG. 3 illustrates an example of receiving, by each of transceivers, a reference signal from an apparatus to be positioned according to at least one example embodiment.

FIG. 3 illustrates an example of receiving, by each of the transceivers 110, 112, 114, and 116, a reference signal from an apparatus to be positioned 20 according to at least one example embodiment.

Referring to FIG. 3, each of the transceiver 110 and the transceiver 112 may receive a reference signal from the apparatus to be positioned 20. In a typical positioning environment, a distance between the transceiver 110 and the transceiver 112 may be sufficiently small compared to a distance between the transceiver 110 or the transceiver 112 and the apparatus to be positioned 20. For example, when a distance ($=2d$) between the transceiver 110 and the transceiver 112 is less than a half of a carrier wavelength of a reference signal, an integer ambiguity issue may not occur. In this case, the processor 200 may not consider an integer ambiguity in calculating a phase difference between the reference signal received by the transceiver 110 and the reference signal received by the transceiver 112. Likewise, when a distance ($=2d$) between the transceiver 114 and the transceiver 116 is less than a half of a carrier wavelength of the reference signal, the processor 200 may not consider an integer ambiguity in calculating a phase difference between the reference signal received by the transceiver 114 and the reference signal received by the transceiver 116.

The processor 200 may calculate a difference in travel distance between reference signals based on a phase difference. For example, the processor 200 may determine a difference between a travel distance (r1) and a travel distance (r2) by calculating a phase difference between reference signals received by the transceiver 110 and the transceiver 112. When a difference (r1−r2) in travel distance between the reference signals is determined, position coordinates of the apparatus to be positioned 20 may be present on a set (hyperbola) of points having a constant difference between a distance from the transceiver 120 and a distance from the transceiver 112.

Figure 4:
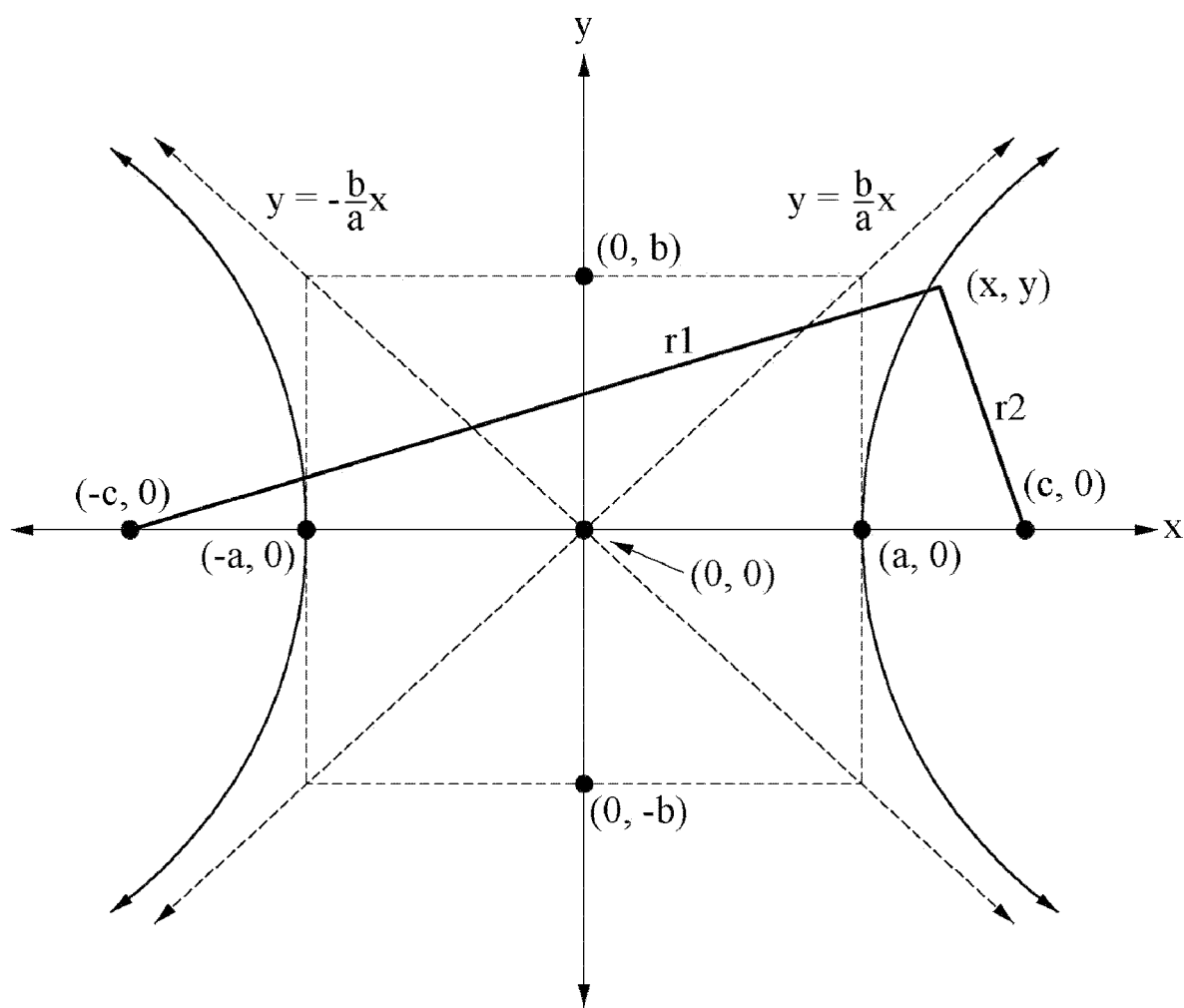
FIG. 4 illustrates an example of a hyperbola according to at least one example embodiment.

FIG. 4 illustrates an example of a hyperbola according to at least one example embodiment.

Referring to FIG. 4, points having a constant difference between a distance (r2) from a point (c,0) and a distance (r1) from a point (−c,0) may form the hyperbola. If positions of two transceivers correspond to the point (c,0) and the point (−c,0), a distance between the transceivers satisfies distance=2c. Also, r1−r2=2a. Also, an equation of the hyperbola may be represented as Equation 1.

$$x^2/a^2 - y^2/b^2 = -1 \qquad \text{[Equation 1]}$$

a and b shown in Equation 1 may satisfy Equation 2.

$$b^2 = c^2 - a^2 \qquad \text{[Equation 2]}$$

In a positioning process, a value of c shown in Equation 2 may correspond to a half of a distance between transceivers included in a transceiver pair. Also, a may correspond to a half of a difference in travel distance between the reference signals corresponding to a phase difference between the reference signals. If c and a are determined, b may be determined according to Equation 2.

When the apparatus to be positioned 20 is sufficiently far away from the transceiver pair, the hyperbola may converge to an asymptote. Equation of the asymptote may be represented as Equation 3.

$$y = \pm \frac{b}{a} x \qquad \text{[Equation 3]}$$

Referring again to FIG. 3, the processor 200 may calculate a difference between a first distance r1 and a second distance r2 based on a phase difference between the reference signals acquired from the transceivers 110 and 112 of a first transceiver pair. The processor 200 may determine an asymptote L11 of a hyperbola based on the distance between the transceivers 110 and 112 included in the first transceiver pair and the difference between the first distance r1 and the second distance r2. Likewise, the processor 200 may determine an asymptote L12 of a hyperbola based on a distance between the transceivers 114 and 116 included in a second transceiver pair and a difference between a third distance r3 and a fourth distance r4. The processor 200 may calculate intersection coordinates of the asymptotes L11 and L12 of two hyperbolas. The processor 200 may determine the intersection coordinates of the asymptotes L11 and L12 of two hyperbolas as position coordinates of the apparatus to be positioned 20.

In FIG. 3, the distance between the transceivers 110 and 112 included in the first transceiver pair may be less than the half of the carrier wavelength of the reference signal. In this case, the difference between the first distance r1 and the second distance r2 may vary within the range of $-\lambda_c/2$ to $\lambda_c/2$. Here, $\lambda_c$ denotes the carrier wavelength of the reference signal. Also, the distance between the transceivers 114, and 116 included in the second transceiver pair may be less than the half of the carrier wavelength of the reference signal. In this case, the difference between the third distance r3 and the fourth distance r4 may vary within the range of $-\lambda_c/2$ to $\lambda_c/2$. As described above, when the distance between the transceivers included in each of the first transceiver pair and the second transceiver pair is less than the half of the carrier wavelength of the reference signal, an integer ambiguity issue may not occur.

That is, when a distance between transceivers that constitute a transceiver pair is sufficiently small, the integer ambiguity issue may not occur. However, when the distance between the transceivers that constitute the transceiver pair is relatively small, an influence of a positioning error for a phase difference may increase, which may lead to degrading a positioning accuracy.

Figure 5:
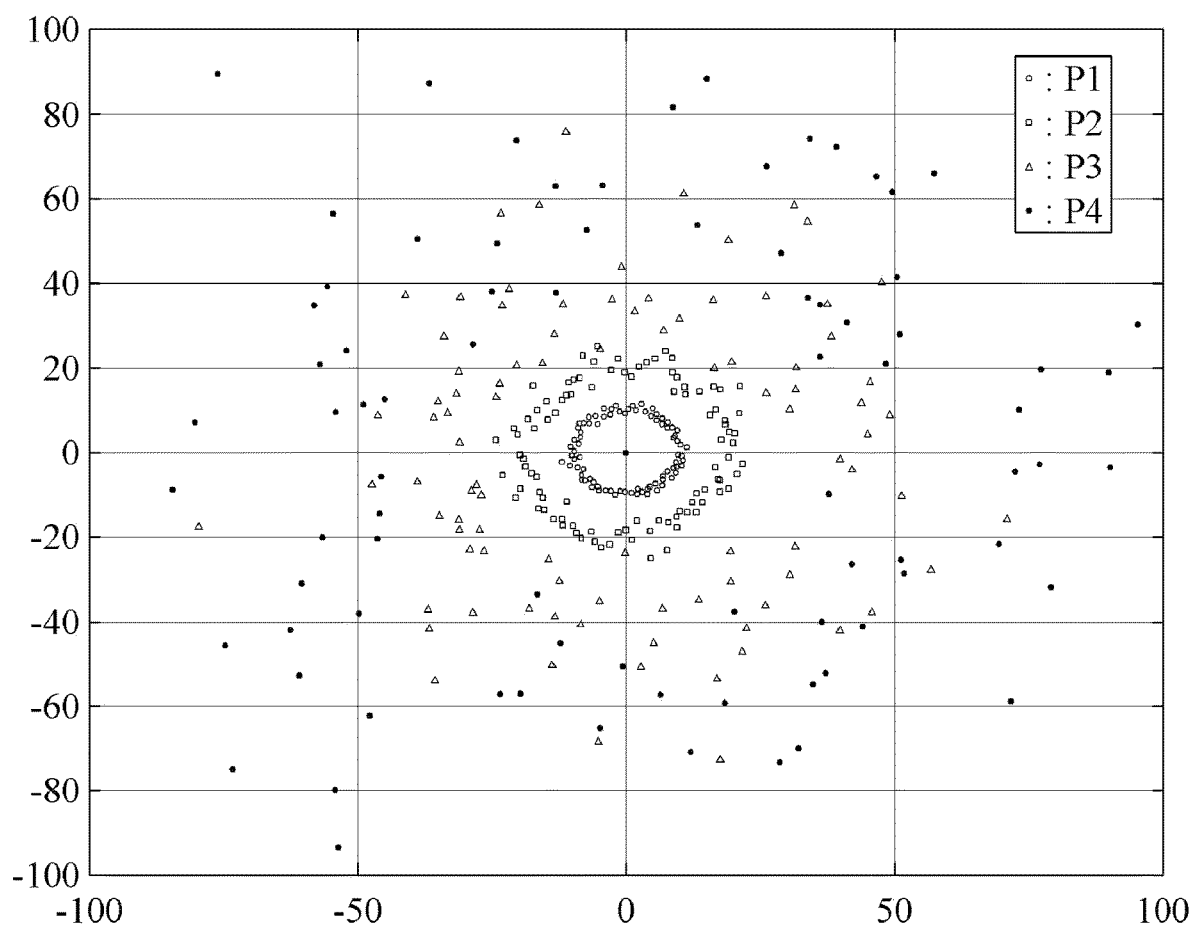
FIG. 5 illustrates an example of a positioning result when a distance between transceivers included in each of transceiver pairs of FIG. 3 is less than a half of a carrier wavelength of a reference signal according to at least one example embodiment.

FIG. 5 illustrates an example of a positioning result when a distance between transceivers included in each of the transceiver pairs of FIG. 3 is less than a half of a carrier wavelength of a reference signal according to at least one example embodiment.

In FIG. 5, P1 represents a result of measuring a position of an apparatus that moves along a circle with the radius of 10 m from transceiver pairs. P2 represents a result of measuring a position of the apparatus that moves along a circle with the radius of 20 m from the transceiver pairs. P3 represents a result of measuring a position of the apparatus that moves along a circle with the radius of 40 m from the transceiver pairs. P4 represents a result of measuring a position of the apparatus that moves along a circle with the radius of 80 m from the transceiver pairs.

Referring to FIG. 5, while a circular motion of the apparatus may be relatively clearly verified from P1 and P2, it may be relatively difficult to verify the circular motion of the apparatus from P3 and P4. That is, as distances from the transceiver pairs increase, a position measurement accuracy of the apparatus may decrease.

Figure 6:
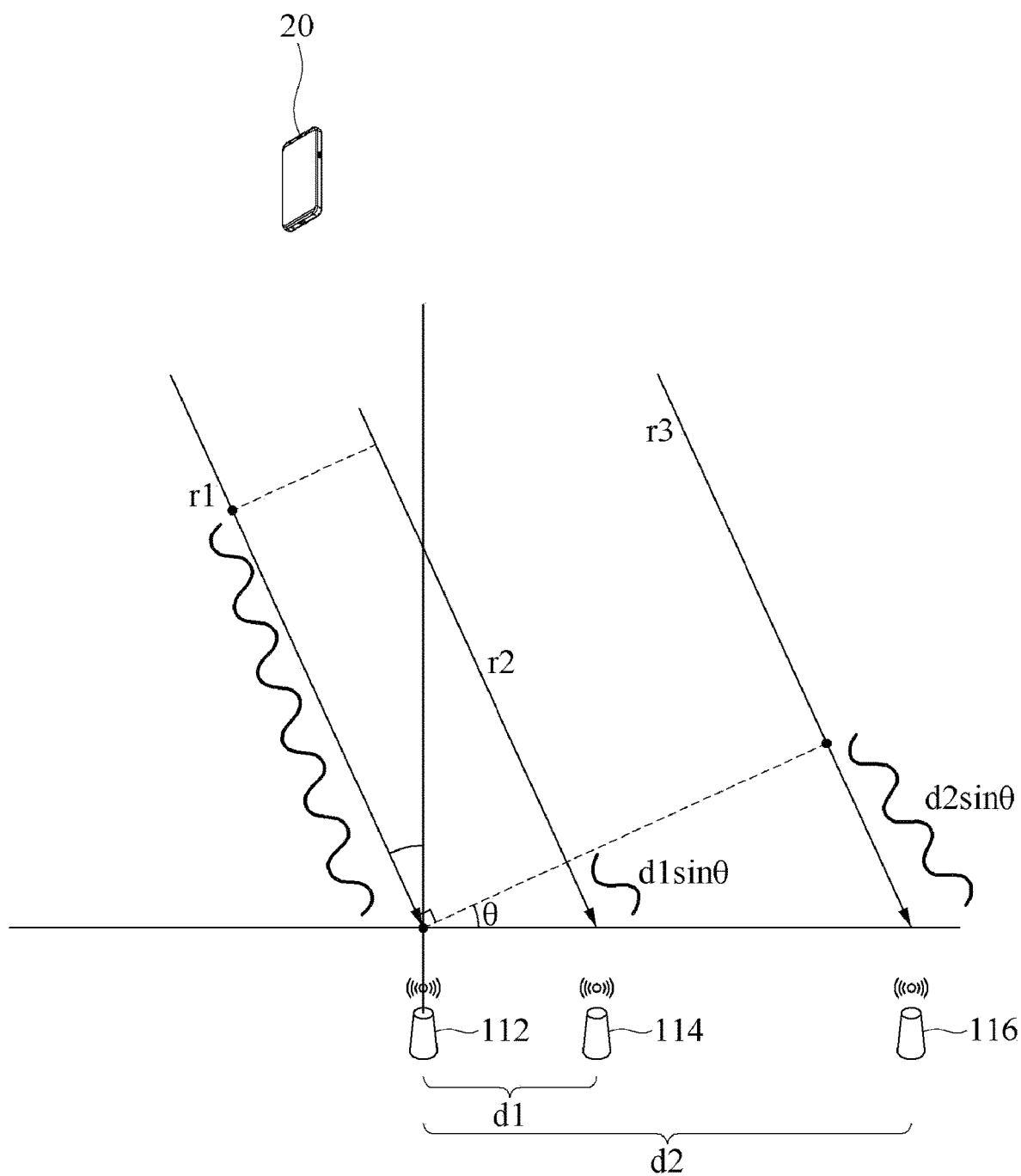
FIG. 6 illustrates an example of an arrangement of transceivers according to at least one example embodiment.

FIG. 6 illustrates an example of an arrangement of the transceivers 112, 114, and 116 according to at least one example embodiment.

Referring to FIG. 6, the transceiver 112 and the transceiver 114 may be provided to be relatively close to each other. The transceiver 112 and the transceiver 116 may be provided to be relatively separate from each other. For example, a distance d1 between the transceiver 112 and the transceiver 114 may be less than a half of a carrier wavelength of a reference signal, and a distance d2 between the transceiver 112 and the transceiver 116 may be greater than the half of the carrier wavelength of the reference signal.

Typically, distances between the apparatus to be positioned 20 and the transceivers 112, 114, and 116 may be significantly greater than distances between the transceivers 112, 114, and 116. Therefore, referring to FIG. 6, a reference signal that arrives at the transceiver 112, a reference signal that arrives at the transceiver 114, and a reference signal that arrives at the transceiver 116 may proceed substantially in parallel. For example, a reference signal transmitted from the apparatus to be positioned 20 may be represented as Equation 4.

$$S(t) = B(t) \cdot e^{i\omega_c t} \qquad \text{[Equation 4]}$$

In Equation 4, B(t) denotes a baseband modulated signal, $e^{i\omega_c t}$ denotes a carrier modulated signal, $\omega_c$ denotes an angular frequency of a carrier, and t denotes a time.

The reference signal received by each of the transceivers 112, 114, and 116 from Equation 4 may be represented as Equation 5.

$$S_A(t) = B(t-\tau_1) \cdot e^{i\omega_c(t-\tau_1)}$$

$$S_B(t) = B(t-\tau_2) \cdot e^{i\omega_c(t-\tau_2)}$$

$$S_C(t) = B(t-\tau_3) \cdot e^{i\omega_c(t-\tau_3)} \qquad \text{[Equation 5]}$$

In Equation 5, $S_A(t)$ denotes the reference signal received by the transceiver 112, $S_B(t)$ denotes the reference signal received by the transceiver 114, and $S_C(t)$ denotes the reference signal received by the transceiver 116. $\tau_1$ denotes a delay time until the reference signal arrives at the transceiver 112, $\tau_2$ denotes a delay time until the reference signal arrives at the transceiver 114, and $\tau_3$ denotes a delay time until the reference signal arrives at the transceiver 116.

For example, the processor 200 may remove a carrier component from each of the reference signals received by the transceivers 112, 114, and 116, respectively, using Equation 6. The processor 200 may acquire a baseband demodulated signal by removing the carrier component.

$$
\begin{aligned}
y_A(t) &= e^{-i\omega_c(t-\epsilon)} \cdot S_A(t-\tau_1) \\
&= e^{-i\omega_c(t-\epsilon)} \cdot e^{i\omega_c(t-\tau_1)} B(t-\tau_1) \\
&= e^{-i\omega_c(\tau_1-\epsilon)} \cdot B(t-\tau_1) \\
y_B(t) &= e^{-i\omega_c(t-\epsilon)} \cdot S_A(t-\tau_2) \\
&= e^{-i\omega_c(t-\epsilon)} \cdot e^{i\omega_c(t-\tau_2)} B(t-\tau_2) \\
&= e^{-i\omega_c(\tau_2-\epsilon)} \cdot B(t-\tau_2) \\
y_C(t) &= e^{-i\omega_c(t-\epsilon)} \cdot S_A(t-\tau_3) \\
&= e^{-i\omega_c(t-\epsilon)} \cdot e^{i\omega_c(t-\tau_3)} B(t-\tau_3) \\
&= e^{-i\omega_c(\tau_3-\epsilon)} \cdot B(t-\tau_3)
\end{aligned} \quad \text{[Equation 6]}
$$

In Equation 6, $y_A(t)$ denotes a baseband demodulated signal of the reference signal received by the transceiver 112, $y_B(t)$ denotes a baseband demodulated signal of the reference signal received by the transceiver 114, $y_C(t)$ denotes a baseband demodulated signal of the reference signal received by the transceiver 116, and E denotes a local clock error corresponding to a synchronization error between the positioning apparatus including the transceivers 112, 114, and 116 and the apparatus to be positioned 20.

Referring to Equation 6, the baseband demodulated signal may include a phase rotation component that is proportional to $\omega_c$.

The processor 200 may select a transceiver pair and may calculate a phase difference between reference signals using baseband demodulated signals corresponding to the selected transceiver pair. For example, the processor 200 may select the transceiver 112 and the transceiver 114 as a first transceiver pair. A distance between the transceivers 112 and 114 included in the first transceiver pair may be less than a half ($\lambda_c/2$) of a carrier wavelength. The processor 200 may select the transceiver 112 and the transceiver 116 as a second transceiver pair. A distance between the transceivers 112 and 116 included in the second transceiver pair may be greater than the half ($\lambda_c/2$) of the carrier wavelength. However, it is provided as an example only. For example, the processor 200 may select the transceiver 114 and the transceiver 116 as the second transceiver pair.

The processor 200 may calculate a phase difference between reference signals received by the first transceiver pair. For example, the processor 200 may calculate a conjugate multiplication of the baseband demodulated signal $y_B(t)$ and the baseband demodulated signal $y_A(t)$. Here, the conjugate multiplication of $y_B(t)$ and $y_A(t)$ may be defined as a multiplication of $y_A(t)^*$ that is complex conjugate of $y_B(t)$ and $y_A(t)$.

The processor 200 may calculate a phase difference between reference signals received by the second transceiver pair. For example, the processor 200 may calculate a conjugate multiplication of the baseband demodulated signal $y_C(t)$ and the baseband demodulated signal $y_A(t)$.

The conjugate multiplication of $y_B(t)$ and $y_A(t)$ may be represented as Equation 7.

$$
\begin{aligned}
y_B(t)y_A(t)^* &= e^{-i\omega_c(\tau_2-\epsilon)} \cdot B(t-\tau_2) \cdot e^{i\omega_c(\tau_1-\epsilon)} \cdot B(t-\tau_1)^* \\
&= e^{-i\omega_c(\tau_2-\tau_1)} \cdot B(t-\tau_2)B(t-\tau_1)^*
\end{aligned} \quad \text{[Equation 7]}
$$

The conjugate multiplication of $y_C(t)$ and $y_A(t)$ may be represented as Equation 8.

$$
\begin{aligned}
y_C(t)y_A(t)^* &= e^{-i\omega_c(\tau_3-\epsilon)} \cdot B(t-\tau_3) \cdot e^{i\omega_c(\tau_1-\epsilon)} \cdot B(t-\tau_1)^* \\
&= e^{-i\omega_c(\tau_3-\tau_1)} \cdot B(t-\tau_3)B(t-\tau_1)^*
\end{aligned} \quad \text{[Equation 8]}
$$

In a typical positioning environment, distances between the transceivers 112, 114, and 116 are sufficiently small and thus, $(\tau_2-\tau_1)$ and $(\tau_3-\tau_1)$ may be less than a sample time interval of reference signals. That is, all of $B(t-\tau_1)$, $B(t-\tau_2)$, and $B(t-\tau_3)$ may be substantially equal to each other. Therefore, $B(t-\tau_2)B(t-\tau_1)^*$ may include only a real part. Also, $B(t-\tau_3)B(t-\tau_1)^*$ may include only a real part.

In Equation 7, a phase angle of $y_B(t)y_A(t)^*$ may be substantially equal to a phase angle of $e^{-i\omega_c(\tau_2-\tau_1)}$. Likewise, in Equation 8, a phase angle of $y_C(t)y_A(t)^*$ may be substantially equal to a phase angle of $e^{i\omega_c(\tau_3-\tau_1)}$.

For example, the processor 200 may calculate a phase angle of each of $y_B(t)y_A(t)^*$ and $y_C(t)y_A(t)^*$ using Equation 9.

$$
\begin{aligned}
\text{angle}(y_B(t)y_A(t)^*) &= -\omega_c(\tau_2-\tau_1) = \frac{2\pi}{\lambda_c}(r_1-r_2) \\
\text{angle}(y_C(t)y_A(t)^*) &= -\omega_c(\tau_3-\tau_1) = \frac{2\pi}{\lambda_c}(r_1-r_3)
\end{aligned} \quad \text{[Equation 9]}
$$

In Equation 9, an angle function represents a function that outputs a phase angle of a complex number. For example, the processor 200 may extract a real part and an imaginary part of the complex number and may calculate an output value of the angle function using an inverse trigonometric function. For example, the processor 200 may calculate a ratio of the real part and the imaginary part of the complex number and may calculate the output value of the angle function by inputting the calculated ratio to an arctangent function.

Referring to Equation 9, the processor 200 may calculate a phase difference $-\omega_c(\tau_2-\tau_1)$ between reference signals received by the first transceiver pair from $y_B(t)y_A(t)^*$. Also, the phase difference $-\omega_c(\tau_2-\tau_1)$ may depend on a difference $(r_1-r_2)$ in travel distance between the reference signals. For example, the processor 200 may calculate a difference $(r_1-r_2)$ in travel distance between the reference signals received by the first transceiver pair and a difference $(r_1-r_3)$ in travel distance between the reference signals received by the second transceiver pair using Equation 10.

$$
r_1 - r_2 = \frac{\text{angle}(y_B(t)y_A(t)^*)}{2\pi} \cdot \lambda_c \quad \text{[Equation 10]}
$$

-continued
$$r_1 - r_3 = \frac{\text{angle}(y_C(t)y_A(t)^*)}{2\pi} \cdot \lambda_c$$

The distance between the transceivers 112 and 114 included in the first transceiver pair may be less than $\lambda_c/2$ that is the half of the carrier wavelength. Therefore, in Equation 10, $r_1-r_2$ may be within the range of $-\lambda_c/2$ to $\lambda_c/2$. Therefore, the processor 200 may not consider an integer ambiguity in a process of determining an output value of angle $(y_B(t)y_A(t)^*)$. However, the distance between the transceivers 112 and 116 may be greater than $\lambda_c/2$ that is the half of the carrier wavelength. Here, since a codomain of the angle function is $-\pi$ to $\pi$ (or 0 to $2\pi$), the processor 200 may consider the integer ambiguity in a process of outputting an output value of angle $(y_C(t)y_A(t)^*)$. Considering the integer ambiguity, $r_1-r_3$ of Equation 10 may be modified and represented as Equation 11.

$$r_1 - r_3 = \left(\frac{\text{angle}(y_C(t)y_A(t)^*)}{2\pi} + \mathbb{I}\right) \cdot \lambda_c \quad \text{[Equation 11]}$$

In Equation 11, $\mathbb{I}$ denotes the integer ambiguity that is considered in a process of outputting a phase angle of $y_C(t)y_A(t)^*$.

The processor 200 may determine an integer ambiguity of the phase difference between the reference signals received by the second transceiver pair based on the phase difference between the reference signals received by the first transceiver pair.

For example, referring to FIG. 6, the difference $(r_1-r_2)$ in travel distance between the reference signals received by the first transceiver pair may be represented as Equation 12.

$$r_1 - r_2 = \frac{\text{angle}(y_B(t)y_A(t)^*)}{2\pi} \cdot \lambda_c = d1 \cdot \sin\theta \quad \text{[Equation 12]}$$

Also, the difference $(r_1-r_3)$ in travel distance between the reference signals received by the second transceiver pair may be represented as Equation 13.

$$r_1 - r_3 = \left(\frac{\text{angle}(y_C(t)y_A(t)^*)}{2\pi} + \mathbb{I}\right) \cdot \lambda_c = d2 \cdot \sin\theta \quad \text{[Equation 13]}$$

Integer ambiguity $\mathbb{I}$ from Equation 12 and Equation 13 may be represented as Equation 14.

$$\mathbb{I} = \frac{d2}{d1} \cdot \frac{\text{angle}(y_B(t)y_A(t)^*)}{2\pi} - \frac{\text{angle}(y_C(t)y_A(t)^*)}{2\pi} \quad \text{[Equation 14]}$$

In Equation 14, a part of $$\frac{\text{angle}(y_C(t)y_A(t)^*)}{2\pi}$$

may be range of $-\frac{1}{2}$ to $\frac{1}{2}$. Also, the integer ambiguity II may have an integer value. Therefore, Equation 14 may be represented as Equation 15.

$$\mathbb{I} = \text{int}\left(\frac{d2}{d1} \cdot \frac{\text{angle}(y_B(t)y_A(t)^*)}{2\pi}\right) \quad \text{[Equation 15]}$$

In Equation 15, into denotes a function that returns a largest integer among integers less than or equal to an input value.

Using Equation 15, the processor 200 may determine the integer ambiguity $\mathbb{I}$ of the phase difference between the reference signals acquired from the second transceiver pair, based on angle $(y_B(t)y_A(t)^*)$ that is the phase difference between the reference signals acquired from the first transceiver pair. The processor 200 may calculate the difference $(r_1-r_3)$ in travel distance between the reference signals received by the second transceiver pair by substituting the integer ambiguity determined using Equation 15 into Equation 13.

The processor 200 may determine an asymptote of a hyperbola corresponding to the second transceiver pair based on position coordinates of the transceivers 112 and 116 included in the second transceiver pair and the difference $(r_1-r_3)$ in travel distance between the reference signals received by the second transceiver pair.

In FIG. 6, the processor 200 may further select a third transceiver pair. For example, the processor 200 may select the transceiver 114 and the transceiver 116 as the third transceiver pair. A distance between the transceiver 114 and the transceiver 116 included in the third transceiver pair may be greater than a half of a carrier wavelength of a reference signal. As described above, the processor 200 may determine an integer ambiguity of a phase difference between reference signals acquired from the third transceiver pair based on the phase difference between the reference signals acquired from the first transceiver pair. The processor 200 may determine an asymptote of a hyperbola corresponding to the third transceiver pair based on position coordinates of the transceivers 114, and 116 included in the third transceiver pair and a difference $(r_2-r_3)$ in travel distance between the reference signals received by the third transceiver pair. The processor 200 may determine position coordinates of the apparatus to be positioned 20 by calculating an intersection between the asymptote of the hyperbola corresponding to the third transceiver pair and the asymptote of the hyperbola corresponding to the second transceiver pair.

FIG. 6 illustrates an example in which three transceivers are arranged a single line. As described above, at least four transceivers may be arranged in a single line.

Figure 7:
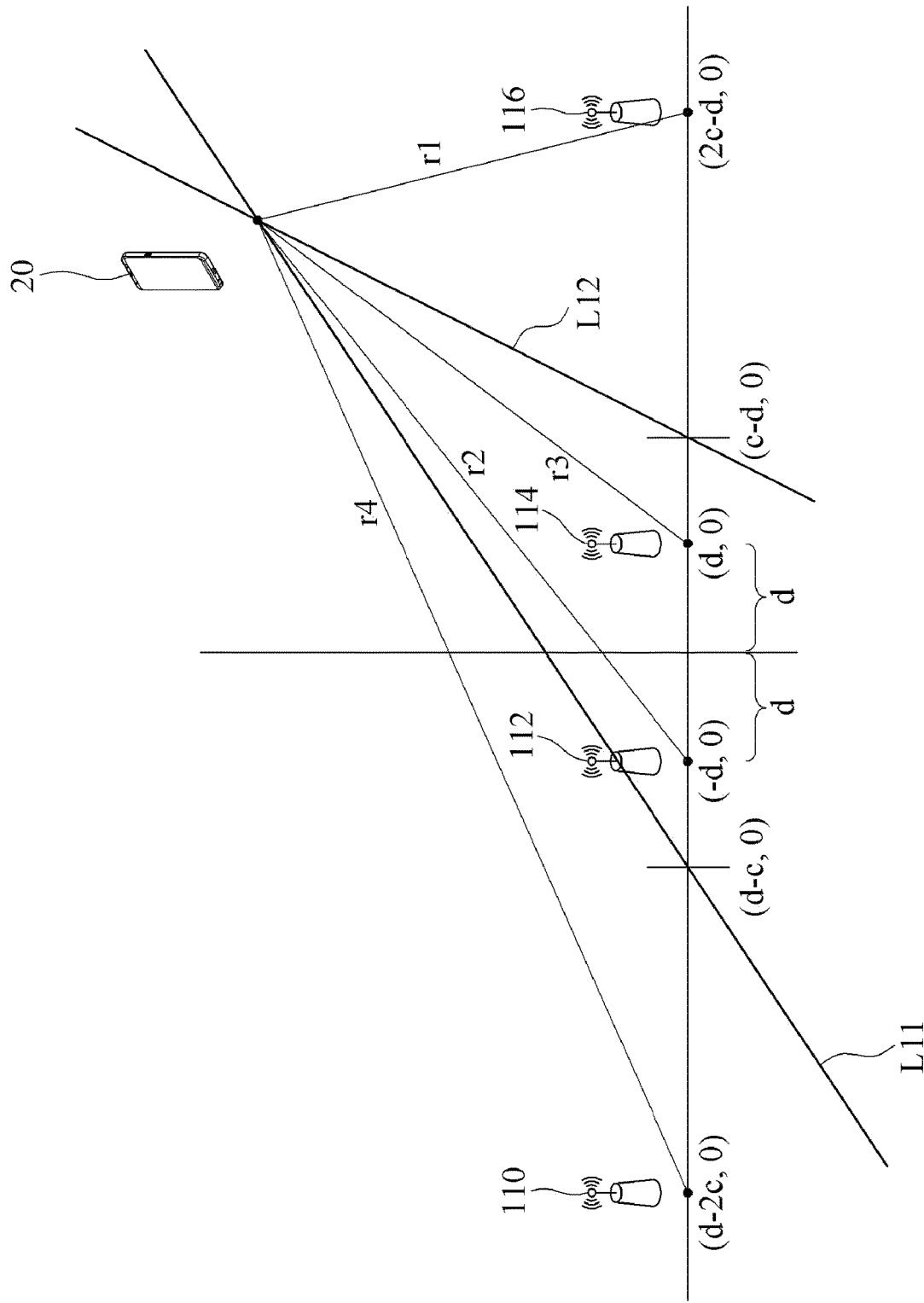
FIG. 7 illustrates an example of an arrangement of transceivers according to at least one example embodiment.

FIG. 7 illustrates an example of an arrangement of the transceivers 110, 112, 114, and 116 according to at least one example embodiment.

Referring to FIG. 7, four transceivers 110, 112, 114, and 116 may be arranged in a single line. The processor 200 may select at least three transceiver pairs from among the four transceivers 110, 112, 114, and 116. A distance between transceivers included in at least one transceiver pair may be less than a half of a carrier wavelength of a reference signal. Also, a distance between transceivers included in each of at least two transceiver pairs may be greater than the half of the carrier wavelength of the reference signal.

For example, the first transceiver pair may include the transceiver 112 and the transceiver 114, the second transceiver pair may include the transceiver 110 and the transceiver 114, and the third transceiver pair may include the transceiver 112 and the transceiver 116.

A distance $(2d)$ between the transceivers 112 and 114 included in the first transceiver pair may be less than the half of the carrier wavelength of the reference signal. A distance ($2c$) between the transceivers 110 and 114 included in the second transceiver pair may be greater than the half of the carrier wavelength of the reference signal. A distance ($2c$) between the transceivers 112 and 116 included in the third transceiver pair may be greater than the half of the carrier wavelength of the reference signal.

Travel distances of the reference signals that arrive at the transceivers 110, 112, 114, and 116 may be represented as $r_1$, $r_2$, $r_3$, and $r_4$, and time delays of the reference signals that arrive at the transceivers 110, 112, 114, and 116 may be represented as $\tau_i$, $\tau_2$, $\tau_3$, and $\tau_4$. The reference signals received by the transceivers 110, 112, 114, and 116 may be represented as Equation 16.

$$S_A(t)=B(t-\tau 1)\cdot e^{i\omega_c(t-\tau_1)}$$

$$S_B(t)=B(t-\tau_2)\cdot e^{i\omega_c(t-\tau_2)}$$

$$S_C(t)=B(t-\tau_3)\cdot e^{i\omega_c(t-\tau_3)}$$

$$S_D(t)=B(t-\tau_4)\cdot e^{i\omega_c(t-\tau_4)} \qquad \text{[Equation 16]}$$

Referring to FIG. 7, in Equation 16, $S_A(t)$ denotes the reference signal received by the transceiver 110, $S_B(t)$ denotes the reference signal received by the transceiver 112, $S_C(t)$ denotes the reference signal received by the transceiver 114, and $S_D(t)$ denotes the reference signal received by the transceiver 116.

Baseband demodulated signals respectively corresponding to the reference signals of Equation 16 may be represented as Equation 17.

[Equation 17]

$$y_A(t)=e^{-\omega_c(\tau_1-\epsilon)}\cdot B(t-\tau_1)$$

$$y_B(t)=e^{-\omega_c(\tau_1-\epsilon)}\cdot\cdot B(t-\tau_2)$$

$$y_C(t)=e^{-\omega_c(\tau_1-\epsilon)}\cdot B(t-\tau_3)$$

$$y_D(t)=e^{-\omega_c(\tau_1-\epsilon)}\cdot B(t-\tau_4)$$

A ratio between the distance ($2d$) between the transceivers 112 and 114 included in the first transceiver pair and the distance ($2c$) between the transceivers 110 and 114 included in the second transceiver pair may be d:c. A ratio between the distance ($2d$) between the transceivers 112 and 114 included in the first transceiver pair and the distance ($2c$) between the transceivers 112 and 116 included in the third transceiver pair may be d:c.

Therefore, an integer ambiguity of a phase difference between the reference signals received by the second transceiver pair and an integer ambiguity of a phase difference between the reference signals received by the third transceiver pair may be represented as Equation 18.

$$\mathbb{I} = \text{int}\left(\frac{c}{d}\cdot\frac{\text{angle}(y_C(t)y_A(t)^*)}{2\pi}\right) \qquad \text{[Equation 18]}$$

Referring to Equation 18, the integer ambiguity may be determined based on a distance difference ratio $$\frac{c}{d}$$

and a phase difference angle ($y_C(t)y_B(t)^*$) between the reference signals received by the first transceiver pair.

FIG. 7 illustrates an example in which the distance ($2c$) between the transceivers 110 and 114 included in the second transceiver pair is equal to the distance ($2c$) between the transceivers 112 and 116 included in the third transceiver pair. Therefore, in the example of FIG. 7, an integer ambiguity for the second transceiver pair may be equal to an integer ambiguity for the third transceiver pair. In this case, a process of calculating, by the processor 200, the integer ambiguity may be simplified. However, it is provided as an example only. For example, the distance between the transceivers 110 and 114 included in the second transceiver pair may differ from the distance between the transceivers 112 and 116 included in the third transceiver pair. In this case, the integer ambiguity for the second transceiver pair may differ from the integer ambiguity for the third transceiver pair.

The processor 200 may calculate a distance difference ($r_1-r_3$) between reference signals received by the second transceiver pair based on the integer ambiguity determined using Equation 18 and angle ($y_C(t)y_A(t)^*$). The processor 200 may calculate a distance difference ($r_2-r_4$) between reference signals received by the second transceiver pair based on the integer ambiguity determined using Equation 18 and angle ($y_D(t)y_B(t)^*$).

The processor 200 may determine an asymptote L11 of a hyperbola corresponding to the second transceiver pair based on coordinates of the transceivers 110 and 114 included in the second transceiver pair and the distance difference ($r_1-r_3$) between the reference signals received by the second transceiver pair.

Equation of the asymptote L11 of the hyperbola corresponding to the second transceiver pair may be represented as Equation 19.

$$y = \frac{b_1}{a_1}(x-c+d) \qquad \text{[Equation 19]}$$

$a_1$ and $b_1$ of Equation 19 may satisfy Equation 20.

$$2a_1=r_1-r_3 \qquad \text{[Equation 20]}$$

$$b_1^2=c^2-a_1^2$$

Equation of an asymptote L12 of a hyperbola corresponding to the third transceiver pair may be represented as Equation 21.

$$y = \frac{b_2}{a_2}(x+c-d) \qquad \text{[Equation 21]}$$

$a_2$ and $b_2$ of Equation 21 may satisfy Equation 22.

$$2a_2=r_2-r_4$$

$$b_2^2=c^2-a_2^2$$

The processor 200 may calculate an intersection of the asymptote L11 of the hyperbola corresponding to the second transceiver pair and the asymptote L12 of the hyperbola corresponding to the third transceiver pair. For example, the processor 200 may calculate an interaction of two asymptotes L11 and L12 using Equation 23.

$$\begin{bmatrix} b_1 & -a_1 \\ b_2 & -a_2 \end{bmatrix}\begin{bmatrix} x \\ y \end{bmatrix} = \begin{bmatrix} b_1 c \\ -b_2 c \end{bmatrix} \qquad \text{[Equation 23]}$$

-continued $$\therefore \begin{bmatrix} x \\ y \end{bmatrix} = \frac{c}{a_2b_1 - a_1b_2} \begin{bmatrix} a_2b_1 + a_1b_2 \\ 2b_1b_2 \end{bmatrix}$$

In Equation 23, $$\begin{bmatrix} b_1 & -a_1 \\ b_2 & -a_2 \end{bmatrix}$$

denotes a coefficient matrix determined by the asymptote L11 and the asymptote L12 and $$\begin{bmatrix} b_1c \\ -b_2c \end{bmatrix}$$

denotes a source vector determined by the asymptote L11 and the asymptote L12.

The processor 200 may calculate coordinates of the apparatus to be positioned 20 by multiplying the source vector by an inverse matrix of the coefficient matrix. For example, the processor 200 may calculate coordinates of the apparatus to be positioned 20 using Equation 24.

$$\begin{bmatrix} x \\ y \end{bmatrix} = \frac{c}{a_2b_1 - a_1b_2} \begin{bmatrix} a_2b_1 + a_1b_2 \\ 2b_1b_2 \end{bmatrix} \quad \text{[Equation 24]}$$

According to the example embodiment, the processor 200 may improve a positioning accuracy by performing positioning based on a phase difference between reference signals received by the second transceiver pair including relatively widely provided transceivers and a phase difference between reference signals received by the third transceiver pair. Also, the processor 200 may determine an integer ambiguity based on a phase difference between reference signals received by the first transceiver pair including transceivers provided at intervals less than the half of the carrier wavelength of a reference signal.

Figure 8:
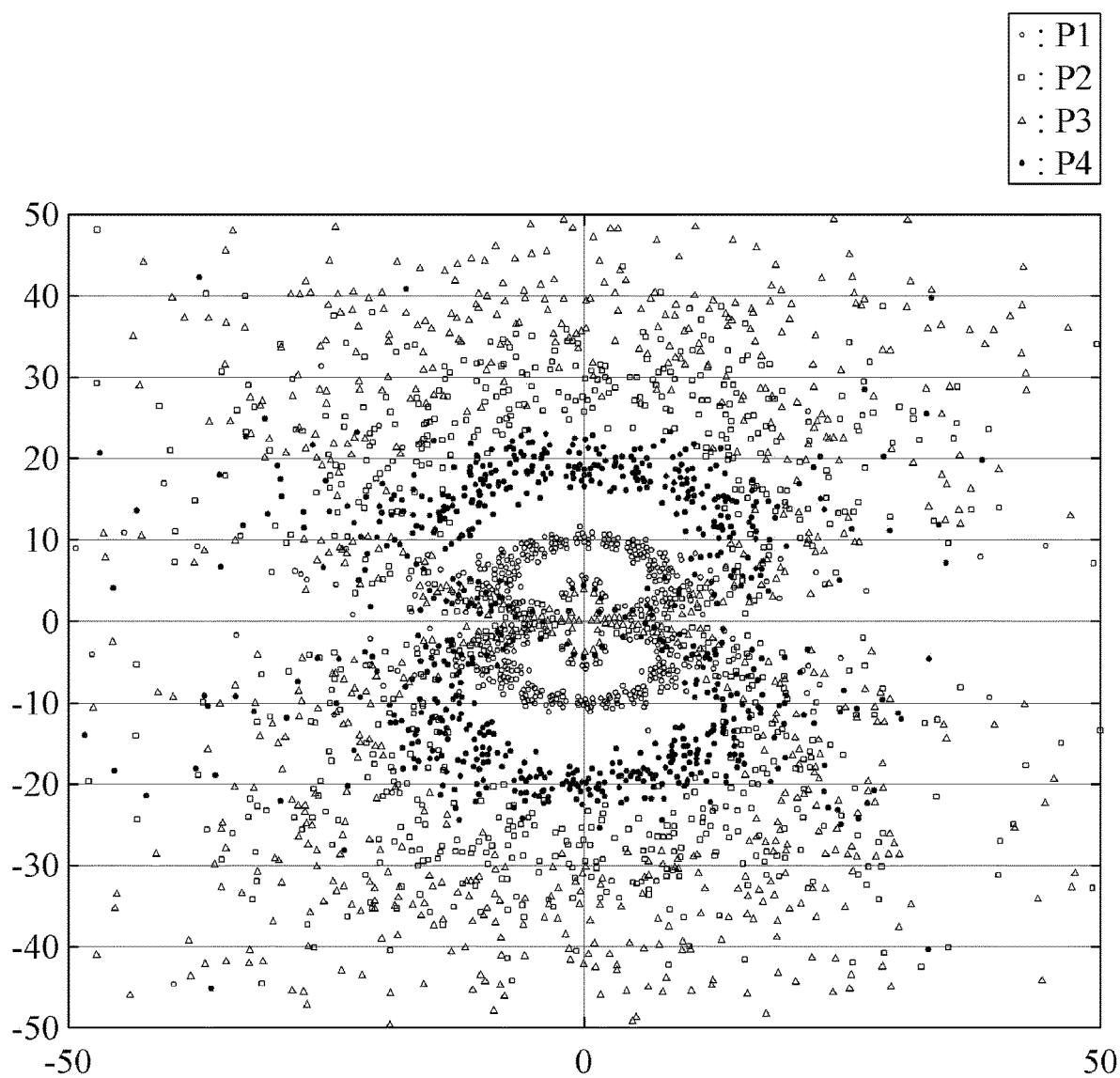
FIG. 8 illustrates an example of a positioning result using the transceivers of FIG. 7 according to at least one example embodiment.

FIG. 8 illustrates an example of a positioning result using the transceivers 110, 112, 114, and 116 of FIG. 7 according to at least one example embodiment.

In FIG. 8, P1 represents a result of measuring a position of an apparatus that moves along a circle with the radius of 10 m from transceiver pairs. P2 represents a result of measuring a position of the apparatus that moves along a circle with the radius of 20 m from the transceiver pairs. P3 represents a result of measuring a position of the apparatus that moves along a circle with the radius of 40 m from the transceiver pairs. P4 represents a result of measuring a position of the apparatus that moves along a circle with the radius of 80 m from the transceiver pairs.

Referring to FIG. 8, the circular motion trajectory of the apparatus that moves along the circle with the radius of 20 m or more from the transceiver pairs may be relatively well verified. That is, compared to the result of FIG. 5, it can be seen from the result of FIG. 8 that the positioning accuracy is improved.

In FIG. 8, the positioning result may not be well verified around a line in which the transceivers 110, 112, 114, and 116 are arranged. When the apparatus to be positioned 20 is present around the line in which the transceivers 110, 112, 114, and 116 are arranged, a direction in which reference signals arriving at the transceivers 110, 112, 114, and 116 travel may be in parallel to the line in which the transceivers 110, 112, 114, and 116 are arranged. In this case, an interaction between the transceivers 110, 112, 114, and 116 or a phenomenon in which a portion of the transceivers 110, 112, 114, and 116 blocks a signal reception route of other transceivers 110, 112, 114, and 116 may occur.

Figure 9:
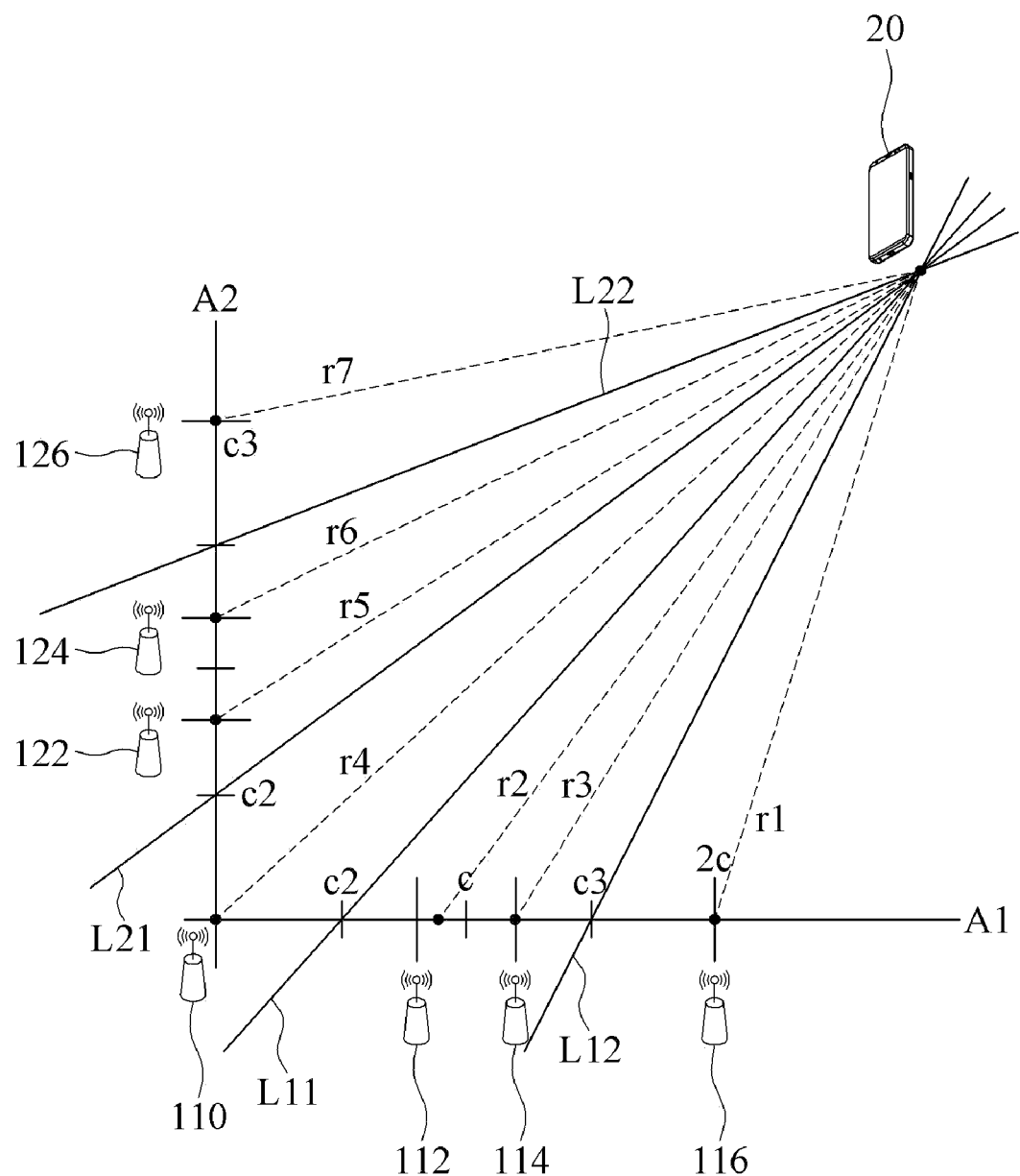
FIG. 9 illustrates an example of an arrangement of transceivers according to at least one example embodiment.

FIG. 9 illustrates an example of an arrangement of the transceivers 110, 112, 114, 116, 122, 124, and 126 according to at least one example embodiment.

Referring to FIG. 9, at least three transceivers may be arranged in each of a first line A1 and a second line A2. For example, the transceivers 110, 112, 114, and 116 may be arranged in the first line A1 and the transceivers 110, 122, 124, and 126 may be arranged in the second line A2.

At least three transceiver pairs may be selected from the first line A1. For example, a distance between the transceivers 112 and 114 included in a first transceiver pair may be less than a half of a carrier wavelength of a reference signal. A distance between the transceivers 110 and 114 included in a second transceiver pair may be greater than the half of the carrier wavelength of the reference signal. A distance between the transceivers 112 and 116 included in a third transceiver pair may be greater than the half of the carrier wavelength of the reference signal.

The processor 200 may determine an integer ambiguity of each of the second transceiver pair and the third transceiver pair based on a phase difference between the reference signals received by the first transceiver pair. The processor 200 may determine an asymptote L11 of a hyperbola for the second transceiver pair and an asymptote L12 of a hyperbola for the third transceiver pair.

The second line A2 and the first line A1 may intersect each other. FIG. 9 illustrates an example in which the second line A2 is perpendicular to the first line A1. However, it is provided as an example only. For example, an intersection angle between the first line A1 and the second line A2 may not be $\pi/2$.

At least three transceiver pairs may be selected from the second line A2. For example, a distance between the transceivers 122 and 124 included in a fourth transceiver pair may be less than a half of a carrier wavelength of a reference signal. A distance between the transceivers 110 and 124 included in a fifth transceiver pair may be greater than the half of the carrier wavelength of the reference signal. A distance between the transceivers 122 and 126 included in a sixth transceiver pair may be greater than the half of the carrier wavelength of the reference signal.

The processor 200 may determine an integer ambiguity of each of the fifth transceiver pair and the sixth transceiver pair based on a phase difference between reference signals received by the fourth transceiver pair. The processor 200 may determine an asymptote L21 of a hyperbola for the fifth transceiver pair and an asymptote L22 of a hyperbola for the sixth transceiver pair.

The processor 200 may determine a matrix equation based on the asymptotes L11, L12, L21, and L22. For example, the processor 200 may calculate coordinates of the apparatus to be positioned 20 using Equation 25.

$$\begin{bmatrix} x \\ y \end{bmatrix} = pinv \begin{bmatrix} ab_1 & -1 \\ ab_2 & -1 \\ 1 & -ab_3 \\ 1 & -ab_4 \end{bmatrix} \begin{bmatrix} c_2 \cdot ab_1 \\ c_3 \cdot ab_2 \\ -c_2 \cdot ab_3 \\ -c_3 \cdot ab_4 \end{bmatrix}$$

In Equation 25, $ab_1$ denotes a gradient of the asymptote L11, $ab_2$ denotes a gradient of the asymptote L12, $-ab_3$ denotes an inverse number of a gradient of the asymptote L21, and −ab₄ denotes an inverse number of a gradient of the asymptote L22.

Referring to Equation 25, the processor 200 may calculate a pseudo inverse matrix of a coefficient matrix that is determined based on four asymptotes L11, L12, L21, and L22. The processor 200 may calculate position coordinates of the apparatus to be positioned 20 by calculating a multiplication of the pseudo inverse matric of the coefficient matrix and a source vector FIG. 10 illustrates an example of a positioning result using the transceivers 110, 112, 114, 116, 122, 124, and 126 of FIG. 9 according to at least one example embodiment.

Figure 10:
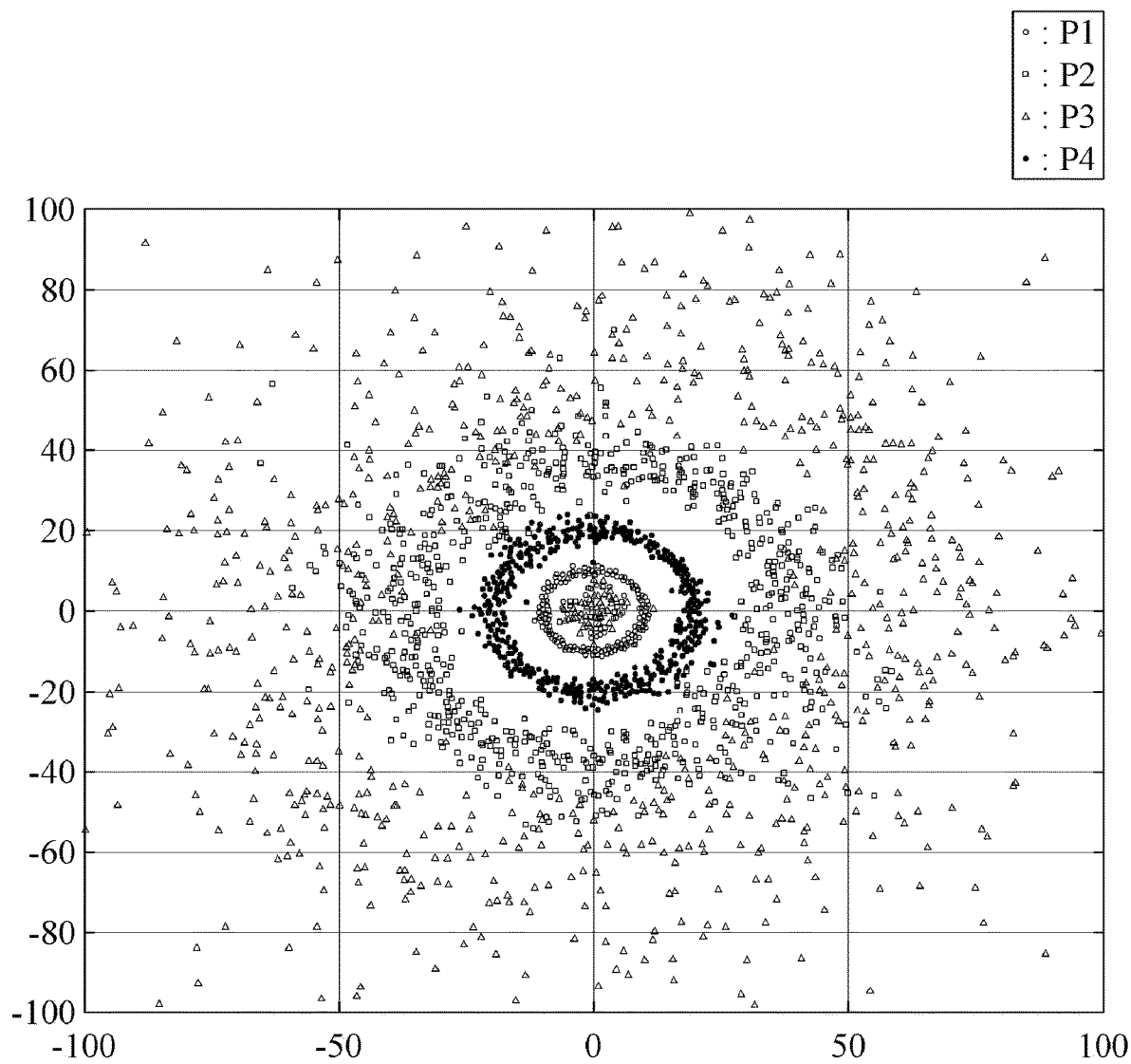
FIG. 10 illustrates an example of a positioning result using the transceivers of FIG. 9 according to at least one example embodiment.

Referring to FIG. 10, it can be verified that a positioning result is improved even around the first line A1 and the second line A2 of FIG. 9. For example, when the apparatus to be positioned 20 is near the first line A1, a positioning process may be smoothly performed by the transceivers 110, 122, 124, and 126 that are arranged in the second line A2. Also, when the apparatus to be positioned 20 is near the second line A2, the positioning process may be smoothly performed by the transceivers 110, 112, 114, and 116 arranged in the first line A1.

The positioning apparatus and method according to example embodiments is described with reference to FIGS. 1 to 10. According to at least one example embodiment, it is possible to determine a position of an apparatus to be positioned based on a phase difference between reference signals received by a transceiver pair. According to at least one example embodiment, it is possible to easily determine an integer ambiguity of a phase difference between reference signals received by a transceiver pair. According to at least one example embodiment, it is possible to perform smooth positioning regardless of a position of an apparatus to be positioned by arranging transceiver pairs in at least two lines.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processors having an internal and/or external memory, for example, a microprocessor, a controller such as a microcontroller and an embedded microcontroller, a microcomputer, an arithmetic logic unit (ALU), and a digital signal processor such as a programmable digital signal processor or other programmable devices. In addition, or, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A positioning apparatus comprising:
a communicator comprising at least three transceivers that are arranged in a first line, and a processor configured to,
calculate a first phase difference between reference signals received by a first transceiver pair arranged in the first line, by converting the reference signals received by the first transceiver pair to baseband demodulated signals, by calculating a conjugate multiplication of the baseband demodulated signals, and by calculating a phase angle of the conjugate multiplication of the baseband demodulated signals;
and a second phase difference between reference signals received by a second transceiver pair arranged in the first line, by converting the reference signals received by the first transceiver pair to baseband demodulated signals, by calculating a conjugate multiplication of the baseband demodulated signals, and by calculating a phase angle of the conjugate multiplication of the baseband demodulated signals;
and a third phase difference between reference signals received by a third transceiver pair arranged in the first line, by converting the reference signals received by the first transceiver pair to baseband demodulated signals, by calculating a conjugate multiplication of the baseband demodulated signals, and by calculating a phase angle of the conjugate multiplication of the baseband demodulated signals;
determine an integer ambiguity of the second phase difference and an integer ambiguity of the third phase difference based on the first phase difference, and
calculate a position of an apparatus to be positioned based on the second phase difference, the integer ambiguity of the second phase difference, the third phase difference, and the integer ambiguity of the third phase difference.

2. The positioning apparatus of claim 1, wherein a distance between transceivers included in the first transceiver pair is less than a distance between transceivers included in the second transceiver pair and a distance between transceivers included in the third transceiver pair.

3. The positioning apparatus of claim 2, wherein the distance between the transceivers included in the first transceiver pair is less than a half of a carrier wavelength of the reference signal, and
each of the distance between the transceivers included in the second transceiver pair and the distance between the transceivers included in the third transceiver pair is greater than the half of the carrier wavelength of the reference signal.

4. The positioning apparatus of claim 1, wherein the processor is configured to,
determine a first asymptote of a hyperbola corresponding to the second transceiver pair based on the second phase difference and the integer ambiguity of the second phase difference,
determine a second asymptote of a hyperbola corresponding to the third transceiver pair based on the third phase difference and the integer ambiguity of the third phase difference, and
calculate the position of the apparatus to be positioned based on the first asymptote and the second asymptote.

5. The positioning apparatus of claim 4, wherein the processor is configured to determine a coefficient matrix and a right-hand side vector based on the first asymptote and the second asymptote and to calculate the position of the apparatus to be positioned using the coefficient matrix and the right-hand side vector.

6. The positioning apparatus of claim 1, wherein the communicator further comprises at least three transceivers that are arranged in a second line intersecting the first line.

7. The positioning apparatus of claim 6, wherein the processor is configured to,
calculate a fourth phase difference between reference signals received by a fourth transceiver pair arranged in the second line, a fifth phase difference between reference signals received by a fifth transceiver pair arranged in the second line, and a sixth phase difference between reference signals received by a sixth transceiver pair arranged in the second line,
determine an integer ambiguity of the fifth phase difference and an integer ambiguity of the sixth phase difference based on the fourth phase difference, and
calculate the position of the apparatus to be positioned by further considering the fifth phase difference, the integer ambiguity of the fifth phase difference, the sixth phase difference, and the integer ambiguity of the sixth phase difference.

8. The positioning apparatus of claim 7, wherein a distance between transceivers included in the fourth transceiver pair is less than a distance between transceivers included in the fifth transceiver pair and a distance between transceivers included in the sixth transceiver pair.

9. The positioning apparatus of claim 8, wherein the distance between the transceivers included in the fourth transceiver pair is less than a half of a carrier wavelength of the reference signal, and each of the distance between the transceivers included in the fifth transceiver pair and the distance between the transceivers included in the sixth transceiver pair is greater than the half of the carrier wavelength of the reference signal.

10. The positioning apparatus of claim 7, wherein the processor is configured to, determine a first asymptote of a hyperbola corresponding to the second transceiver pair based on the second phase difference and the integer ambiguity of the second phase difference, determine a second asymptote of a hyperbola corresponding to the third transceiver pair based on the third phase difference and the integer ambiguity of the third phase difference, determine a third asymptote of a hyperbola corresponding to the fifth transceiver pair based on the fifth phase difference and the integer ambiguity of the fifth phase difference, determine a fourth asymptote of a hyperbola corresponding to the sixth transceiver pair based on the sixth phase difference and the integer ambiguity of the sixth phase difference, and calculate the position of the apparatus to be positioned based on the first asymptote, the second asymptote, the third asymptote, and the fourth asymptote.

11. The positioning apparatus of claim 10, wherein the processor is configured to calculate the position of the apparatus to be positioned by determining a coefficient matrix and a right-hand side vector based on the first asymptote, the second asymptote, the third asymptote, and the fourth asymptote and by calculating a multiplication between a pseudo inverse matrix of the coefficient matrix and the right-hand side vector.

12. A positioning method performed by a positioning apparatus comprising a communicator and a processor, wherein the communicator comprises at least three transceivers that are arranged in a first line, and the positioning method comprises:

receiving, by each of the transceivers arranged in the first line, a reference signal from an apparatus to be positioned; calculating, by the processor, a first phase difference between reference signals received by a first transceiver pair arranged in the first line, by converting the reference signals received by the first transceiver pair to baseband demodulated signals, by calculating a conjugate multiplication of the baseband demodulated signals, and by calculating a phase angle of the conjugate multiplication of the baseband demodulated signals;

and a second phase difference between reference signals received by a second transceiver pair arranged in the first line, by converting the reference signals received by the first transceiver pair to baseband demodulated signals, by calculating a conjugate multiplication of the baseband demodulated signals, and by calculating a phase angle of the conjugate multiplication of the baseband demodulated signals;

and a third phase difference between reference signals received by a third transceiver pair arranged in the first line, by converting the reference signals received by the first transceiver pair to baseband demodulated signals, by calculating a conjugate multiplication of the baseband demodulated signals, and by calculating a phase angle of the conjugate multiplication of the baseband demodulated signals;

determining, by the processor, an integer ambiguity of the second phase difference and an integer ambiguity of the third phase difference based on the first phase difference; and calculating, by the processor, a position of the apparatus to be positioned based on the second phase difference, the integer ambiguity of the second phase difference, the third phase difference, and the integer ambiguity of the third phase difference.

13. The positioning method of claim 12, wherein a distance between the transceivers included in the first transceiver pair is less than a half of a carrier wavelength of the reference signal, and each of a distance between the transceivers included in the second transceiver pair and a distance between the transceivers included in the third transceiver pair is greater than the half of the carrier wavelength of the reference signal.

14. The positioning method of claim 12, wherein the calculating, by the processor, the position of the apparatus to be positioned comprises:

determining a first asymptote of a hyperbola corresponding to the second transceiver pair based on the second phase difference and the integer ambiguity of the second phase difference;

determining a second asymptote of a hyperbola corresponding to the third transceiver pair based on the third phase difference and the integer ambiguity of the third phase difference; and calculating the position of the apparatus to be positioned based on the first asymptote and the second asymptote.

15. The positioning method of claim 12, wherein the communicator further comprises at least three transceivers that are arranged in a second line intersecting the first line, and the positioning method further comprises:

calculating, by the processor, a fourth phase difference between reference signals received by a fourth transceiver pair arranged in the second line, a fifth phase difference between reference signals received by a fifth transceiver pair arranged in the second line, and a sixth phase difference between reference signals received by a sixth transceiver pair arranged in the second line; and determining, by the processor, an integer ambiguity of the fifth phase difference and an integer ambiguity of the sixth phase difference based on the fourth phase difference.

16. The positioning method of claim 15, wherein a distance between the transceivers included in the fourth transceiver pair is less than a half of a carrier wavelength of the reference signal, and each of a distance between the transceivers included in the fifth transceiver pair and a distance between the transceivers included in the sixth transceiver pair is greater than the half of the carrier wavelength of the reference signal.

17. The positioning method of claim 15, wherein the calculating, by the processor, the position of the apparatus to be positioned comprises:

determining a first asymptote of a hyperbola corresponding to the second transceiver pair based on the second phase difference and the integer ambiguity of the second phase difference;

determining a second asymptote of a hyperbola corresponding to the third transceiver pair based on the third phase difference and the integer ambiguity of the third phase difference;

determining a third asymptote of a hyperbola corresponding to the fifth transceiver pair based on the fifth phase difference and the integer ambiguity of the fifth phase difference;

determining a fourth asymptote of a hyperbola corresponding to the sixth transceiver pair based on the sixth phase difference and the integer ambiguity of the sixth phase difference; and calculating the position of the apparatus to be positioned based on the first asymptote, the second asymptote, the third asymptote, and the fourth asymptote.

18. The positioning method of claim 17, wherein the calculating, by the processor, the position of the apparatus to be positioned comprises calculating the position of the apparatus to be positioned by determining a coefficient matrix and a right-hand side vector based on the first asymptote, the second asymptote, the third asymptote, and the fourth asymptote and by calculating a multiplication between a pseudo inverse matrix of the coefficient matrix and the right-hand side vector.

* * * * *